(12) United States Patent
Brahme et al.

(10) Patent No.: US 10,612,804 B2
(45) Date of Patent: Apr. 7, 2020

(54) OPERATING AN HVAC SYSTEM TO REACH TARGET TEMPERATURE EFFICIENTLY

(71) Applicant: Lennox Industries Inc., Richardson, TX (US)

(72) Inventors: Rohini Brahme, Irving, TX (US); Ajay Iyengar, Frisco, TX (US); Umesh Gokhale, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 15/980,182

(22) Filed: May 15, 2018

(65) Prior Publication Data

US 2019/0353375 A1    Nov. 21, 2019

(51) Int. Cl.
| | |
|---|---|
| *F24F 11/46* | (2018.01) |
| *F24F 11/56* | (2018.01) |
| *F24F 11/61* | (2018.01) |
| *F24F 11/65* | (2018.01) |
| *G05B 15/02* | (2006.01) |
| *F24F 140/60* | (2018.01) |
| *F24F 110/10* | (2018.01) |

(52) U.S. Cl.
CPC .............. *F24F 11/46* (2018.01); *F24F 11/56* (2018.01); *F24F 11/61* (2018.01); *F24F 11/65* (2018.01); *G05B 15/02* (2013.01); *F24F 2110/10* (2018.01); *F24F 2140/60* (2018.01)

(58) Field of Classification Search
CPC .. F24F 11/46; F24F 11/56; F24F 11/61; F24F 11/65; F24F 2110/10; F24F 2140/60; G05B 15/02
See application file for complete search history.

(56) References Cited

U.S. PATENT DOCUMENTS

| | | | |
|---|---|---|---|
| 10,060,643 B2 * | 8/2018 | Takeda ................ | F24D 19/1084 |
| 2015/0285527 A1 * | 10/2015 | Kim ......................... | F24F 11/64 |
| | | | 700/276 |
| 2015/0293541 A1 * | 10/2015 | Fadell ....................... | F24F 11/30 |
| | | | 700/276 |
| 2017/0159955 A1 * | 6/2017 | Kobayashi ............... | F24F 11/89 |
| 2019/0024925 A1 * | 1/2019 | Wu ........................... | F24F 11/46 |

* cited by examiner

*Primary Examiner* — Abdelmoniem I Elamin
(74) *Attorney, Agent, or Firm* — Baker Botts L.L.P.

(57) ABSTRACT

An HVAC system for a comfort zone includes a compressor, temperature sensor and controller. The controller is configured to receive a starting temperature from the temperature sensor, receive a desired temperature, and receive a desired time for the comfort zone to reach the desired temperature. The controller is further configured to determine a starting time to adjust cooling the comfort zone, the starting time determined based at least on the desired time, the desired temperature, the starting temperature, and a most-energy-efficient operating speed of the compressor. Once the starting time has been reached, the controller is further configured to communicate a command to the HVAC system to operate the compressor at the most-energy-efficient operating speed.

20 Claims, 4 Drawing Sheets

OPERATING AN HVAC SYSTEM TO REACH TARGET TEMPERATURE EFFICIENTLY

TECHNICAL FIELD

This disclosure relates generally to operating a heating, ventilation, and air conditioning ("HVAC") system. More specifically, this disclosure relates to a system and method of operating an HVAC system efficiently based on a predicted indoor air temperature.

BACKGROUND

Heating, ventilation, and air conditioning ("HVAC") systems can be used to regulate the environment within an enclosed space. Typically, an air blower is used to pull air from the enclosed space into the HVAC system through ducts and push the air back into the enclosed space through additional ducts after conditioning the air (e.g., heating, cooling or dehumidifying the air). Various types of HVAC systems, such as residential and commercial, may be used to provide conditioned air for enclosed spaces.

Each HVAC system typically includes a HVAC controller that directs the operation of the HVAC system. The HVAC controller can direct the operation of a conditioning unit, such as an air conditioner or a heater, to control the temperature of the enclosed space.

SUMMARY OF THE DISCLOSURE

According to one embodiment, a heating ventilation and air conditioning system for a comfort zone includes a compressor, temperature sensor and controller. The controller is configured to receive a starting temperature from the temperature sensor, receive a desired temperature, and receive a desired time for the comfort zone to reach the desired temperature. The controller is further configured to determine a starting time to adjust cooling the comfort zone, the starting time determined based at least on the desired time, the desired temperature, the starting temperature, and a most-energy-efficient operating speed of the compressor. Once the starting time has been reached, the controller is further configured to communicate a command to the HVAC system to operate the compressor at the most-energy-efficient operating speed.

Certain embodiments may provide one or more technical advantages. For example, an embodiment of the present disclosure may predict indoor air temperature of a comfort zone at a target time. As another example, an embodiment of the present invention may operate an HVAC system based on a predicted indoor air temperature of a comfort zone. In such an embodiment, the HVAC system may be operated in a manner that permits the enclosed space to reach a setpoint by the time of interest. As yet another example, the HVAC system may be operated to reach the setpoint temperature at the time of interest by operating the compressor at its most-energy-efficient speed. Operating the compressor at its most-energy-efficient speed may provide the advantage of reduced energy consumption by the HVAC system. This reduced energy consumption of the HVAC system may be realized as operational cost savings to the owner of the HVAC system. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
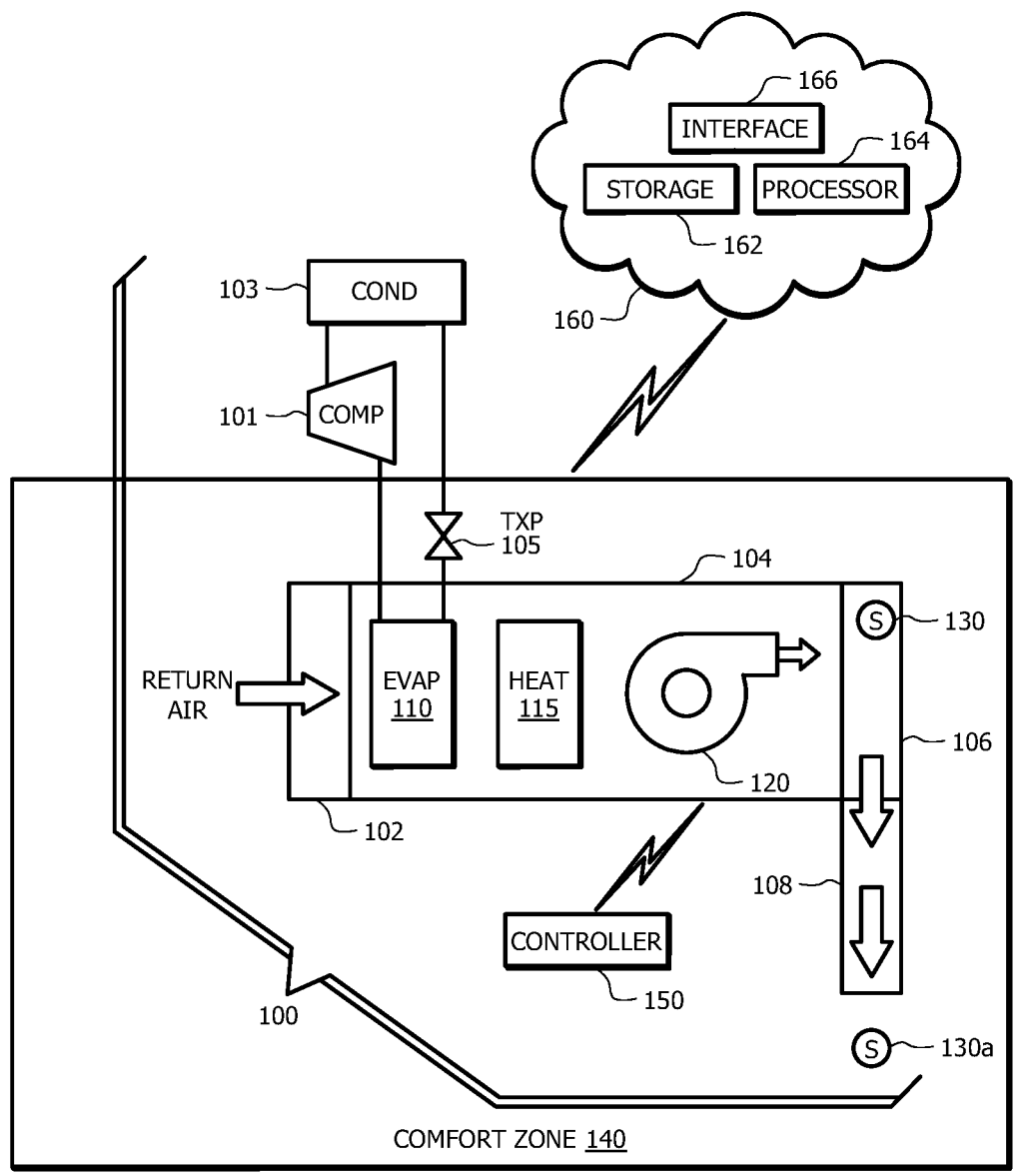
FIG. 1 illustrates an example of a heating, ventilation, and air condition ("HVAC") system operable to provide conditioned air to an enclosed space, according to certain embodiments.
Figure 2A:
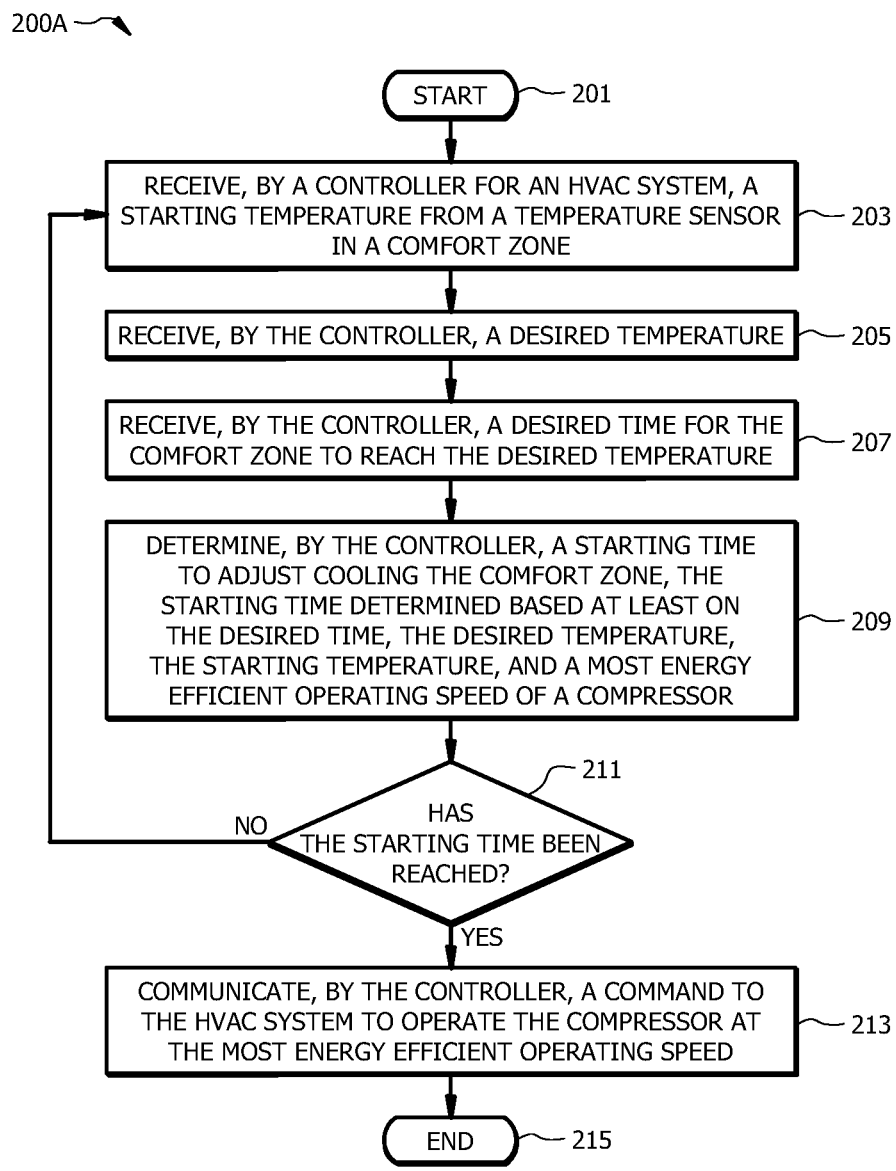
FIG. 2A is a flow chart illustrating a method of operation for at least one controller associated with the HVAC system of FIG. 1, according to certain embodiments.
Figure 2B:
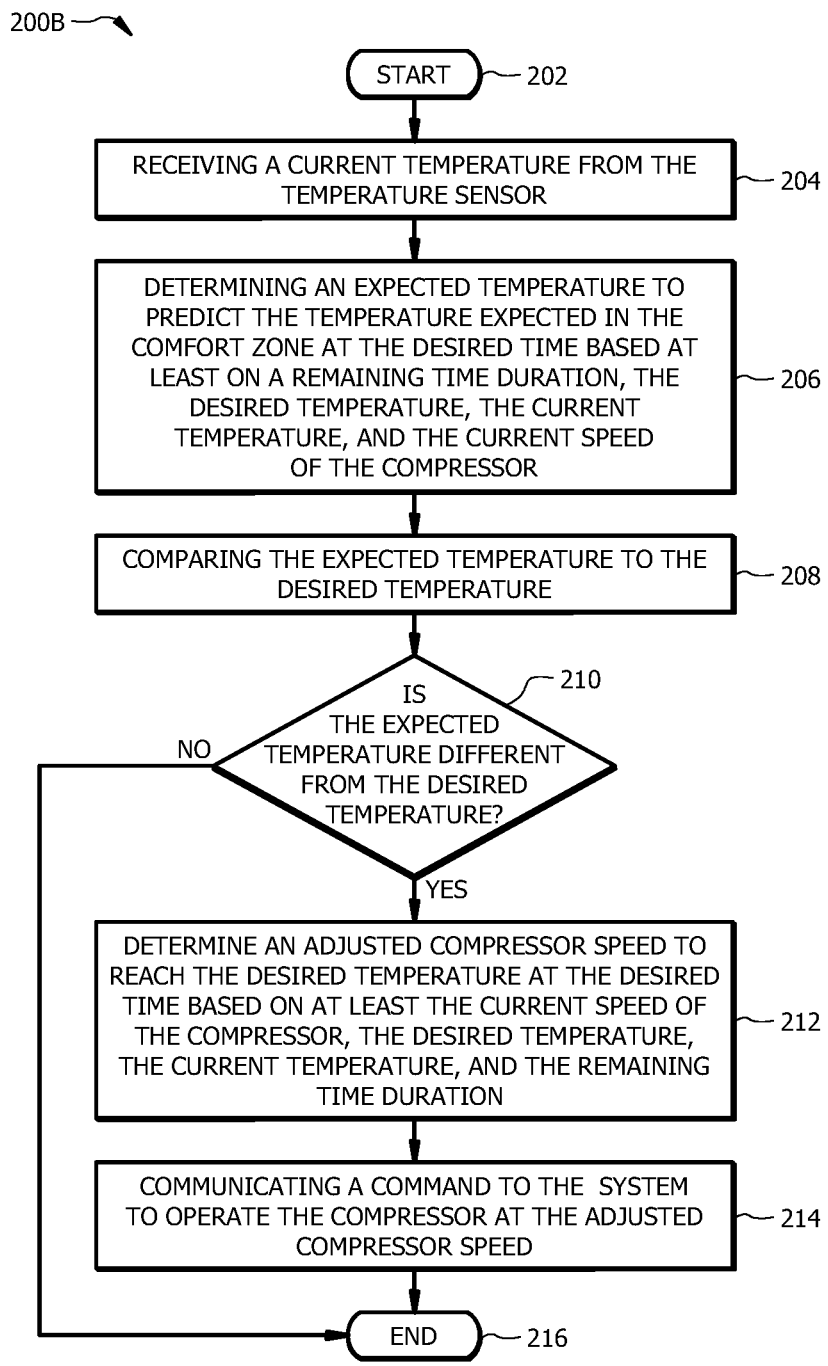
FIG. 2B is a flow chart illustrating an additional method of operating for the at least one controller, according to certain embodiments.
Figure 3:
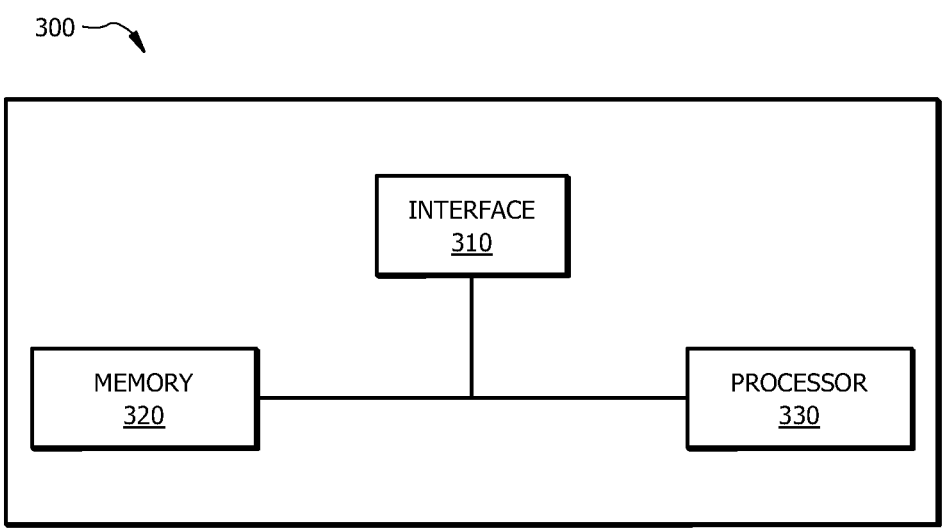
FIG. 3 illustrates an example of a controller for the HVAC system of FIG. 1, according to certain embodiments.

Embodiments of the present disclosure and its advantages are best understood by referring to FIGS. 1 through 3 of the drawings, like numerals being used for like and corresponding parts of the various drawings.

Conventional HVAC systems are typically configured to permit a user to set one or more desired temperatures for an enclosed space (e.g., a home). A user may set a desired temperature using a wall-mounted thermostat that further permits the user to indicate a time associated with such comfort temperature. For example, a user may expect to be out of the house from 9 a.m. to 5:30 p.m. but in the house from 5:30 p.m. to 9 a.m. As such, the user may program the thermostat to maintain a temperature of 70° Fahrenheit from 5:30 p.m. to 9 a.m. but reach warmer temperatures (e.g., 78° Fahrenheit) when user is expected to be out of the house. Because the HVAC system may not begin to cool the house to 70° Fahrenheit until 5:30 p.m., the user may be uncomfortably warm in the house until the comfort temperature is reached.

To avoid such problem, the user may program the thermostat with a setback time to begin cooling prior to the user's expected arrival at the home (e.g., 5:00 p.m.). However, initiating the cooling cycle at a set time may also have various disadvantages. For example, the HVAC system may turn on at 5:00 p.m. (thirty minutes before estimated arrival time) to begin cooling the enclosed space to 70° Fahrenheit when the HVAC system could have reached 70° Fahrenheit in less than seven minutes (e.g., if the temperature of the enclosed space was 72° Fahrenheit at 5:00 p.m.). As such, the HVAC system is operated longer and less efficiently than necessary, thereby wasting energy, costing money, and reducing the operational life of one or more HVAC components. As another example, the HVAC system may turn on at 5:00 (thirty minutes before estimated arrival time) to begin cooling the enclosed space to 70° Fahrenheit but doesn't reach the comfort temperature by the time user arrives home because the HVAC system could not meet the required load to condition the space in time (e.g., if the temperature of the enclosed space is 78°). As such, the user may be uncomfortably warm in the house until the comfort temperature is reached. Accordingly, conventional HVAC systems may be unable to consistently reach a comfort temperature by a particular time while also operating in an efficient manner.

This disclosure recognizes operating an HVAC system both in an energy efficient manner and with the desirable feature of operating an HVAC system in different modes between occupied and unoccupied periods. As will be explained in more detail below, the disclosed system comprises at least one processor configured to dynamically operate an HVAC by predicting a starting time to operate the HVAC system such that the desired temperature of the comfort space may be reached at the desired time when the HVAC system is operated at its most-energy-efficient operating conditions. As such, the HVAC system is operated in an efficient manner (not operating unnecessarily) and a user isn't subjected to an uncomfortably cold or warm enclosed space. In certain embodiments, the system may override the pre-configured setback time with a fixed amount of time to use the dynamic starting time function to operate the HVAC system more efficiently. In certain other embodiments, the system may allow that for the unoccupied time a user does not have to set a selected temperature. Additionally, in some embodiments, the at least one processor receives information about an occupancy status of the enclosed space and adjusts the HVAC operation schedule based on the occupancy status information. As a result, a user may not have to re-program an HVAC system to accommodate changes in his/her expected arrival times at the house. Instead, the HVAC system may learn about these changes and adjust the HVAC operation schedule based on these learned changes.

FIG. 1 illustrates an example of an HVAC system 100. HVAC system 100 includes a return duct 102, a return plenum 104, a supply duct 106 and a supply plenum 108. Additionally, HVAC system 100 includes conditioning systems for cooling and heating air in an enclosed space or comfort zone 140. The conditioning systems include a cooling system and a heating system or heating source 115. The cooling system can include a refrigeration circuit having a compressor 101, evaporator 110, condenser 103, and thermal expansion device 105 fluidly coupled together. The cooling system represents a single cooling stage of the HVAC system 100. Given the teachings herein, one skilled in the art will understand that this disclosure also applies to other HVAC embodiments having more than one cooling stage and/or more than one compressor 101. The heating system 115 may include a gas furnace, electric heating elements, heat pump, or even a combination thereof. In embodiments where HVAC system 100 operates as a heat pump this may include components 110, 105, 101, and 103. The heating system 115 can also be multi-staged. In certain embodiment, compressor 101 may be a variable speed compressor 101 or a two-stage compressor 101. Variable speed compressors may have different energy efficiencies as different speeds. In certain embodiments, the HVAC system 100 may operate a the overall most energy efficient operating conditions. In certain embodiments, the overall most-energy-efficient operating conditions of the HVAC system 100 may coincide with the most-energy-efficient compressor speed of operating compressor 101. In some embodiments, the most-energy-efficient compressor speed may be the minimum compressor speed of the compressor 101. The minimum compressor speed may be a speed determined to ensure proper operation of compressor 101 and sufficient oil circulation for reliable and sustained operation. In certain embodiments, the most-energy-efficient operating speed is determined based on a parameter or lookup table configured by the manufacturer. In certain embodiments, the most-energy-efficient operating speed is determined based on a learning algorithm that monitors the system at different operating speeds and determines which speed is the most energy efficient. For example, the system may include a self-tuning algorithm that updates the actions (e.g., when to start the system, and at what speed to operate) based on forecasted weather and any changes in the controller configuration (e.g., starting temperature, desired temperature, and desired time for the desired temperature) for a particular house.

The HVAC system 100 also includes an indoor air blower 120, one or more sensors 130, and an HVAC controller 150. Given the teachings herein, one skilled in the art will also understand that HVAC system 100 may include additional components and devices that are not presently illustrated or discussed but are typically included in an HVAC system, such as, a power supply, an expansion valve, etc. Some illustrated components of HVAC system 100 may be contained within a single enclosure (e.g., a cabinet). In one embodiment, HVAC system 100 is a commercial system, such as a rooftop unit. HVAC system 100 can also be a residential system. In some embodiments, the heating and cooling sources for the HVAC system 100 do not operate until activated for conditioning.

The components of the cooling system, the heating system 115 and the indoor air blower 120 may be conventional devices that are typically employed in HVAC systems. At least some of the operation of HVAC system 100 can be controlled by the HVAC controller 150 based on inputs from various sensors of the HVAC system 100. For example, the HVAC controller 150 may command the compressor 101 to operate at a desired compressor speed. HVAC controller 150 may also cause the indoor air blower 120 to move air across the cooling system 110 and into the enclosed space.

Sensors 130 are configured to sense information about the enclosed space and/or components of HVAC system 100. As an example, sensor 130 may include a temperature sensor configured to sense the indoor temperature of an enclosed space. As another example, sensor 130 may include a pressure sensor configured to sense the discharge pressure of a compressor of HVAC system 100. As yet another example, sensor 130 may include an occupancy status sensor configured to sense whether the enclosed space is occupied (e.g., by persons and/or animals). Information sensed by sensors 130 may be sent to controller 150 in some embodiments. In other embodiments, information sensed by sensors 130 may be sent to one or more cloud platforms (e.g., cloud platform 160). Controller or user interface 150 is configured to be an interface between a user and HVAC system 100. User interface 150 can be an HVAC device that has a primary function of communicating between HVAC system 100 and the user. In some embodiments, user interface 150 is a non-HVAC device, such as a smart phone, that includes an application which allows communication between a user and HVAC system 100. There may be multiple user interfaces 150 for HVAC system 100. In some embodiments, a temperature sensor 130a located in a comfort zone 140 and user interface 150 can also be conventional devices. In one embodiment, temperature sensor 130a is a thermostat that also functions as a user interface 150 for HVAC system 100.

HVAC controller 150 may include one or more processors, such as microprocessors, configured to direct the operation of HVAC system 100. Additionally, HVAC controller 150 may include an interface and a memory coupled thereto. The interface may include multiple ports for transmitting and receiving data from at least other components or devices of the HVAC system 100, such as compressor 101, heating system 115, blower 120, and sensors 130. The interface may also receive input from an operator of HVAC system 100. In some embodiments, the interface may receive one or more desired temperature setpoints and one or more corresponding desired times, wherein each time is associated with a particular setpoint. For example, the interface may receive a first desired temperature of 70° Fahrenheit associated with a first desired time of 5:30 p.m. As another example, the interface may receive a second desired temperature of 68° Fahrenheit associated with a second desired time of 6:30 p.m. In another embodiment, the interface may receive one or more desired temperature setpoints corresponding to one or more comfort zones 140. For example, for systems that provide conditioned air to a plurality of comfort zones 140 the interface may receive a first desired temperature of 70° Fahrenheit associated with a first comfort zone and a second desired temperature of 68° Fahrenheit associated with a second comfort zone. The memory section 320 may be a conventional memory that is constructed to store data and computer programs, including data and programs to provide functionality as disclosed herein. Features of controller 150 will be described in further detail with respect to FIG. 3 below.

As illustrated in FIG. 1, HVAC controller 150 is coupled to the various components of the HVAC system 100. In some embodiments, the connections therebetween are through a wired-connection. A conventional cable and contacts may be used to couple the HVAC controller 150 to the various components of HVAC system 100 via the controller interface. In other embodiments, a wireless connection may also be employed to provide at least some of the connections. HVAC controller 150 may also be communicably coupled to one or more cloud platforms 160 configured to store and/or execute instructions corresponding to one or more functions disclosed herein.

In one embodiment, the HVAC controller 150 is configured to operate both the cooling system 110 and the heating system 115 of the HVAC system 100 based on a setpoint temperature. As such, HVAC controller 150 and/or cloud platform 160 is configured to determine if either a heat source or a cooling source for the HVAC system is needed. As will be explained in further detail below, controller 150 may operate components of HVAC system 100 according to a determined schedule. In some embodiments, the schedule is determined by controller 150. In other embodiments, the schedule is determined by cloud platform 160 and implemented by controller 150.

As disclosed in FIG. 1, one or more components of HVAC system 100 may be communicably coupled to cloud platform 160. Cloud platform may include, as depicted in FIG. 1, at least one storage device 162, at least one processor 164, and at least one interface 166. In some embodiments, storage device 162 stores computer-readable instructions for executing one or more functions described herein. Processor 164 of cloud platform 160 may execute any, some, or all of the instructions stored to storage device 162. Interface 166 may be configured to send and/or receive information. As an example, interface 166 may receive information from components of HVAC system 100 (e.g., sensors 130, controller 150) in order to determine an operation schedule of HVAC system 100. As another example, interface 166 may send information (e.g., operation schedule of HVAC system 100) to components of HVA system 100 (e.g., to controller 150).

As will be described in more detail below in reference to the methods 200A and 200B of FIGS. 2A-2B, this disclosure recognizes an intelligent HVAC system operable to dynamically predict a starting time to operate the compressor 101 at its most-energy-efficient speed to cool an enclosed space (e.g., comfort zone 140) to a desired temperature at a desired time. In certain embodiments, the HVAC system is configured to determine a starting time such that the comfort zone 140 will not reach the desired temperature until the desired time. In some embodiments, the HVAC system 100 is considered to have reached the desired temperature at the desired time if it reaches the desired temperature within some margin of error of the desired time. The margin of error depends on the capabilities of the particular HVAC system. As examples, certain HVAC systems may have a margin of error of plus or minus 1 minute, certain HVAC systems may have a margin of error of plus or minus 5 minutes, and other HVAC systems may have a different margin of error. As described herein, HVAC system 100 dynamically determines a start time and commands the compressor 101 to operate at its most-energy-efficient compressor speed beginning at the dynamically determined start time and throughout the period of time from the start time to the desired time. As such, the HVAC system is operated in an efficient manner (not operating unnecessarily) and a user isn't subjected to an uncomfortably cold or warm enclosed space.

In some embodiments, the at least one processor also receives information (e.g., via sensors 130) about an occupancy status of the comfort zone 140. The at least one processor may further adjust the desired time based on the occupancy status information. For example, HVAC system 100 may learn over a period of five days that enclosed space 140 is not occupied from 9:00 a.m. to 7:00 p.m. even though it had previously received information (e.g., via user input) that enclosed space 140 should be 70° F. at 5:30 p.m. In such example, HVAC system 100 may adjust the desired time to 7:00 p.m. rather than 5:30 p.m. Doing otherwise would be wasteful and/or inefficient. In addition to experiencing energy and cost benefits, an operator may save time by not having to reprogram HVAC system to accommodate lifestyle changes. Instead, HVAC system 100 may learn about these changes and adjust the operation of HVAC system 100 based on these learned changes. This learning period may comprise any suitable time period (e.g., 24 hours, 48 hours, seven days, thirty days).

FIG. 2A illustrates a flow chart disclosing a method of operating example HVAC systems. In particular embodiments controller 150 performs method 200A. In step 201, controller 150 initiates method 200A. In certain embodiments, step 201 may coincide with the start of a period of time where the comfort zone 140 is unoccupied. In step 203 controller 150 receive a starting temperature of the comfort zone 140 from a temperature sensor located in the comfort zone 140. In step 205 controller 150 receives a desired temperature for the comfort zone 140. This desired temperature may be provided to controller 150 from a user input received at the controller 150 or remotely, for example from cloud platform 160. In certain other embodiments, the desired temperature may be determined by controller 150 from previously received desired temperatures. In step 207 controller 150 may receive a desired time for the comfort zone 140 to reach the desired temperature received from step 205. In certain embodiments, the desired time may be provided to controller 150 from a user input received at controller 150 or remotely, for example from cloud platform 160. In certain other embodiments, the desired time may be determined by controller 150 from previously received desired times or from a previously received schedule. The desired time may be selected as the anticipated time in which the comfort zone is expected to become occupied. In certain other embodiments, controller 150 may determine the typical time that the comfort zone becomes occupied and may determine the desired time based of the historical occupancy of the comfort zone.

In step 209 controller 150 may determine a starting time to adjust cooling the comfort zone 140. The starting time may be determined based on the starting temperature, the desired temperature, the desired time for the comfort zone 140 to reach the desired temperature, and the most-energy-efficient operating speed of the compressor 101. For example, for an HVAC system 100 that has a compressor 101 with a most-energy-efficient operating speed of 42% of the maximum compressor speed the controller 150 may first determine how long of a time duration it would take the comfort zone 140 to reach the desired temperature from the starting temperature when the compressor 101 is operating at 42% of the maximum compressor speed. As an example, suppose the controller determines that it would take 15 minutes to reach the desired temperature if operating at the most-energy-efficient operating speed. The controller 150 may then determine the starting time to adjust the compressor to the most-energy-efficient speed. In some embodiments, the starting time is based on the desired time to reach the desired temperature and the determined time duration to reach that temperature. Thus, if the desired time to reach the desired temperature is 7:00 PM, and the determined time to reach the desired temperature when operating at the most-energy-efficient speed is 15 minutes, the starting time would be 6:45 PM.

In other embodiments, the controller 150 may determine the starting time based further on historical data of how long it typically takes to reach the desired temperature according to one or more current conditions (e.g., outdoor weather conditions, such as temperature and/or humidity). The controller 150 may determine the amount of time required to reach the desired temperature when operating the HVAC system under current conditions as compared to the amount of time previously observed for reaching a desired temperature under similar conditions.

In step 211 controller 150 may determine if the starting time has been reached. If the starting time has been reached, then controller 150 may proceed to step 213. Otherwise, if the starting time has not yet been reached then controller 150 may return to step 203. In certain embodiments, returning to step 203 of method 200A controller 150 may receive a new starting temperature, new desired temperature, and new desired time. Controller 150 may then calculate a new starting time from the previous iteration of method 200A. In certain other embodiments, at step 211, if the starting time has not been reached the controller may return to step 211 rather than returning to step 203. For example, controller 150 may continuously check if the starting time has been reached until it has actually been reached and then proceed to step 213.

In step 213 when the starting time has been reached controller 150 may communicate a command to the HVAC system to operate the compressor 101 at the most-energy-efficient compressor speed. In certain embodiments the command may be to turn on the compressor 101 and operate it at the most-energy-efficient speed. In other embodiments, adjusting the operation of the compressor includes at least turning the compressor off, decreasing the speed of the compressor, and increasing the speed of the compressor. After communicating the command, controller 150 may periodically determine if adjustments to the operation of HVAC system 100 are needed to reach the desired temperature at the desired time. This will be described in further detail with respect to FIG. 2B below. For example, where the compressor 101 is currently operating, the command may be to adjust the compressor speed from the current operating speed to the most-energy-efficient compressor speed. After step 213 controller 150 may end method 200A in step 215.

In certain embodiments, after ending method 200, controller 150 may perform another iteration of method 200A by initiating it in step 201.

In certain embodiments, after determining a starting time but before the starting time has been reached, the controller 150 is further configured to determine an expected temperature for the comfort zone 140 at the desired time and, if the expected temperature is different from the desired temperature, adjust the starting time. For example, if the temperature within the comfort zone 140 has changed since the starting time was originally determined, the controller 150 may need to operate the HVAC system 100 either earlier or later to meet the desired temperature at the desired time. The method described with respect to FIG. 2A may have more or fewer steps, and the steps may be performed in any suitable order. As an example, steps 203-207 may be performed in any order or may be performed as a single step.

FIG. 2B illustrates a flow chart disclosing a method of operating example HVAC systems. In particular embodiments controller 150 performs method 200B. For example, controller 150 may perform method 200B after the starting time has been reached and a command to operate the compressor 101 at the most-energy-efficient speed has been communicated in order to more closely reach the desired temperature at the desired time. In step 202, controller 150 may initiate method 200B. In step 204 the controller 150 may receive a current temperature from the temperature sensor.

In step 206 the controller 150 may determine an expected temperature to predict the temperature expected in the comfort zone 140 at the desired time based at least on the remaining time duration, the desired temperature, the current temperature, and the current speed of the compressor. In step 208, this expected temperature may be compared to the desired temperature. In step 210, if the controller 150 determines that the expected temperature is different from the desired temperature the controller 150 may proceed to step 212, otherwise the controller 150 may end method 200B at step 216. The determination performed by controller 150 in step 210 may allow for a margin of error in the expected temperature and the desired temperature (e.g., plus or minus 0.25°, 0.5°, 1°, 2°, or 5° Fahrenheit off of the desired temperature).

In step 212, if the controller 150 determines that the expected temperature of the comfort zone 140 at the desired time will be different than the desired temperature then the controller 150 may determine an adjusted compressor speed. The adjusted compressor speed determined by controller 150 in step 212 may be determined based on at least the current speed of the compressor 101, the desired temperature, the current temperature, and the remaining time duration, where the remaining time duration is the time between the current time and the desired time. In step 214, the controller 150 may communicate a command to the HVAC system 100 to operate the compressor 101 at the adjusted compressor speed. The adjusted compressor speed of step 214 may be one of either turning the compressor off, decreasing the speed of the compressor, or increasing the speed of the compressor. In embodiments where the HVAC system 100 is configured for heating mode, in steps 212-214 controller 150 may instead determine and communicate a command to the HVAC system 100 to operate heat pump 101 at an adjusted rate.

After communicating the command in step 214, controller 150 may end method 200B in step 216. From time to time, while operating the compressor 101, controller 150 may initiate another iteration of method 200B by starting at step 202 or any other appropriate step. The method described with respect to FIG. 2B may have more or fewer steps, and the steps may be performed in any suitable order. As an example, steps 204-208 or 212-214 may be performed in any order or may be performed as a single step.

FIG. 3 illustrates an example controller 300 of HVAC system 100, according to certain embodiments of the present disclosure. In some embodiments, controller 300 may be an example of controller 150 described herein in relation to FIGS. 1-2. Controller 300 may comprise one or more interfaces 310, memory 320, and one or more processors 330. Interface 310 receives input (e.g., sensor data or system data), sends output (e.g., data, instructions), processes the input and/or output, and/or performs other suitable operation. Interface 310 may comprise hardware and/or software. As an example, interface 310 receives information (e.g., temperature, operation, speed, pressure information) about one or more components of systems 100 (e.g., via sensors). Interface 310 may also receive information from a user. For example, interface 310 may receive from a user a desired temperature setpoint and/or a desired time for the comfort zone to reach the desired temperature (e.g., when the comfort zone will become occupied with a person or animal).

Memory (or memory unit) 320 stores information. As an example, memory 320 may store method 200. Memory 320 may comprise one or more non-transitory, tangible, computer-readable, and/or computer-executable storage media. Examples of memory 320 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (e.g., a server and/or cloud storage and processing), and/or other computer-readable medium.

Processor 330 may include any suitable combination of hardware and software implemented in one or more modules to execute instructions and manipulate data to perform some or all of the described functions of controller 300. In some embodiments, processor 330 may include, for example, one or more computers, one or more central processing units (CPUs), one or more microprocessors, one or more applications, one or more application specific integrated circuits (ASICs), one or more field programmable gate arrays (FPGAs), and/or other logic.

Although this disclosure describes and depicts predicting conditions associated with enclosed comfort zones based on the most-energy-efficient speed of the compressor 101, this disclosure recognizes that other operating conditions of HVAC system 100 may be controlled by controller 300 to achieve an optimal operating mode for operating HVAC system 100 efficiently.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

What is claimed is:

1. A heating, ventilation, and air conditioning ("HVAC") system for a comfort zone comprising a compressor, a temperature sensor, and a controller;

the controller configured to:
receive a starting temperature for the comfort zone from the temperature sensor;
receive a desired temperature for the comfort zone;
receive a desired time for the comfort zone to reach the desired temperature;
determine a most-energy-efficient operating speed of the compressor that is a percentage of a maximum operating speed of the compressor;
determine an amount of time necessary to operate the compressor at the most-energy-efficient operating speed in order to arrive at the desired temperature from the starting temperature;
determine a starting time to adjust cooling the comfort zone, the starting time determined based at least on the desired time for the comfort zone to reach the desired temperature and the determined amount of time to operate the compressor at the most-energy-efficient operating speed; and
if the starting time has been reached, communicate a command to the HVAC system to operate the compressor at the most-energy-efficient operating speed.

2. The HVAC system of claim 1, wherein the controller is further configured to periodically:
receive a current temperature from the temperature sensor;
determine an expected temperature, wherein the expected temperature predicts a temperature expected in the comfort zone at the desired time, the expected temperature determined based at least on a remaining time duration, the desired temperature, the current temperature, and the current speed of the compressor;
compare the expected temperature to the desired temperature;
if the expected temperature is different from the desired temperature:
determine an adjusted compressor speed to reach the desired temperature at the desired time, the adjusted compressor speed based on at least the current speed of the compressor, the desired temperature, the current temperature, and the remaining time duration; and
communicate a command to the HVAC system to operate the compressor at the adjusted compressor speed.

3. The HVAC system of claim 2, wherein the adjusted compressor speed is selected from a group consisting of turning the compressor off, decreasing the speed of the compressor, and increasing the speed of the compressor.

4. The HVAC system of claim 1, wherein the desired time is based on an expected time that the comfort zone will be occupied.

5. The HVAC system of claim 1, wherein the starting time is determined so that the comfort zone does not reach the desired temperature until the desired time.

6. The HVAC system of claim 1, where in the compressor is a variable speed compressor.

7. The HVAC system of claim 1, where in the compressor is a two-stage compressor.

8. The HVAC system of claim 1, wherein the system is associated with a plurality of comfort zones and the controller is further configured to determine a second start time for a second comfort zone.

9. The HVAC system of claim 1, wherein to determine the starting time, the HVAC system is further operable to set the starting time to begin a configurable amount of time prior to the desired time, the configurable amount of time determined based on determining an amount of time required to reach the desired temperature when operating the HVAC system according to the most-energy-efficient operating speed of the compressor under current conditions;
wherein determining an amount of time required to reach the desired temperature when operating the HVAC system according to the most-energy-efficient operating speed of the compressor under current conditions is based at least in part on comparing an amount of time previously observed for reaching the desired temperature when previously operating the HVAC system according to the most-energy-efficient operating speed of the compressor under conditions similar to the current conditions.

10. The HVAC system of claim 1, wherein the controller is further configured to:
prior to the starting time, determine an expected temperature, wherein the expected temperature predicts a temperature expected in the comfort zone at the desired time; and
if the expected temperature is different from the desired temperature, adjust the starting time.

11. The HVAC system of claim 1, further comprising using the determined starting time to override a pre-configured setback time, the pre-configured setback time corresponding to a fixed amount of time before the desired time.

12. A controller for a heating, ventilation, and air condition ("HVAC") system, the controller comprising processing circuitry and a computer readable storage medium comprising instructions that, when executed by the processing circuitry, cause the controller to:
receive a starting temperature from a temperature sensor in a comfort zone;
receive a desired temperature for the comfort zone;
receive a desired time for the comfort zone to reach the desired temperature;
determine a most-energy-efficient operating speed of the compressor that is a percentage of a maximum operating speed of the compressor;
determine an amount of time necessary to operate the compressor at the most-energy-efficient operating speed in order to arrive at the desired temperature from the starting temperature;
determine a starting time to adjust cooling the comfort zone, the starting time determined based at least on the desired time for the comfort zone to reach the desired temperature and the determined amount of time to operate the compressor at the most-energy-efficient operating speed; and
if the starting time has been reached, communicate a command to the HVAC system to operate the compressor at the most-energy-efficient operating speed.

13. The controller of claim 12, further configured to periodically:
receive a current temperature from the temperature sensor;
determine an expected temperature, wherein the expected temperature predicts a temperature expected in the comfort zone at the desired time, the expected temperature determined based at least on a remaining time duration, the desired temperature, the current temperature, and the current speed of the compressor;
compare the expected temperature to the desired temperature;
if the expected temperature is different from the desired temperature:
determine an adjusted compressor speed to reach the desired temperature at the desired time, the adjusted compressor speed based on at least the current speed of the compressor, the desired temperature, the current temperature, and the remaining time duration; and
communicate a command to the HVAC system to operate the compressor at the adjusted compressor speed;
wherein the adjusted compressor speed is selected from a group consisting of turning the compressor off, decreasing the speed of the compressor, and increasing the speed of the compressor.

14. The controller of claim 12, wherein to determine the starting time, the controller is further operable to set the starting time to begin a configurable amount of time prior to the desired time, the configurable amount of time determined based on determining an amount of time required to reach the desired temperature when operating the HVAC system according to the most-energy-efficient operating speed of the compressor under current conditions;
wherein determining an amount of time required to reach the desired temperature when operating the HVAC system according to the most-energy-efficient operating speed of the compressor under current conditions is based at least in part on comparing an amount of time previously observed for reaching the desired temperature when previously operating the HVAC system according to the most-energy-efficient operating speed of the compressor under conditions similar to the current conditions.

15. The controller of claim 12, further configured to:
prior to the starting time, determine an expected temperature, wherein the expected temperature predicts a temperature expected in the comfort zone at the desired time; and
if the expected temperature is different from the desired temperature, adjust the starting time.

16. The controller of claim 12, wherein the desired time is based on an expected time that the comfort zone will be occupied.

17. The controller of claim 12, wherein the starting time is determined so that the comfort zone does not reach the desired temperature until the desired time.

18. A method for operating a heating, ventilation, and air condition ("HVAC") system, the method comprising:
receiving, by a controller, a starting temperature from a temperature sensor in a comfort zone;
receiving, by the controller, a desired temperature for the comfort zone;

receiving, by the controller, a desired time for the comfort zone to reach the desired temperature;

determining a most-energy-efficient operating speed of the compressor that is a percentage of a maximum operating speed of the compressor;

determining an amount of time necessary to operate the compressor at the most-energy-efficient operating speed in order to arrive at the desired temperature from the starting temperature;

determining, by the controller, a starting time to adjust cooling the comfort zone, the starting time determined based at least on the desired time for the comfort zone to reach the desired temperature and the determined amount of time to operate the compressor at the most-energy-efficient operating speed; and if the starting time has been reached, communicating, by the controller, a command to the HVAC system to operate the compressor at the most-energy-efficient operating speed.

19. The method of claim 18, further comprising:

receiving, by the controller, a current temperature from the temperature sensor;

determining, by the controller, an expected temperature, wherein the expected temperature predicts a temperature expected in the comfort zone at the desired time, the expected temperature determined based at least on a remaining time duration, the desired temperature, the current temperature, and the current speed of the compressor;

comparing, by the controller, the expected temperature to the desired temperature;

if the expected temperature is different from the desired temperature:

determining, by the controller, an adjusted compressor speed to reach the desired temperature at the desired time, the adjusted compressor speed based on at least the current speed of the compressor, the desired temperature, the current temperature, and the remaining time duration; and communicating, by the controller, a command to the HVAC system to operate the compressor at the adjusted compressor speed;

wherein the adjusted compressor speed is selected from a group consisting of turning the compressor off, decreasing the speed of the compressor, and increasing the speed of the compressor.

20. The method of claim 18, wherein determining the starting time further comprises setting the starting time to begin a configurable amount of time prior to the desired time, the configurable amount of time determined based on determining an amount of time required to reach the desired temperature when operating the HVAC system according to the most-energy-efficient operating speed of the compressor under current conditions;

wherein determining an amount of time required to reach the desired temperature when operating the HVAC system according to the most-energy-efficient operating speed of the compressor under current conditions is based at least in part on comparing an amount of time previously observed for reaching the desired temperature when previously operating the HVAC system according to the most-energy-efficient operating speed of the compressor under conditions similar to the current conditions.

* * * * *